Figure 15:
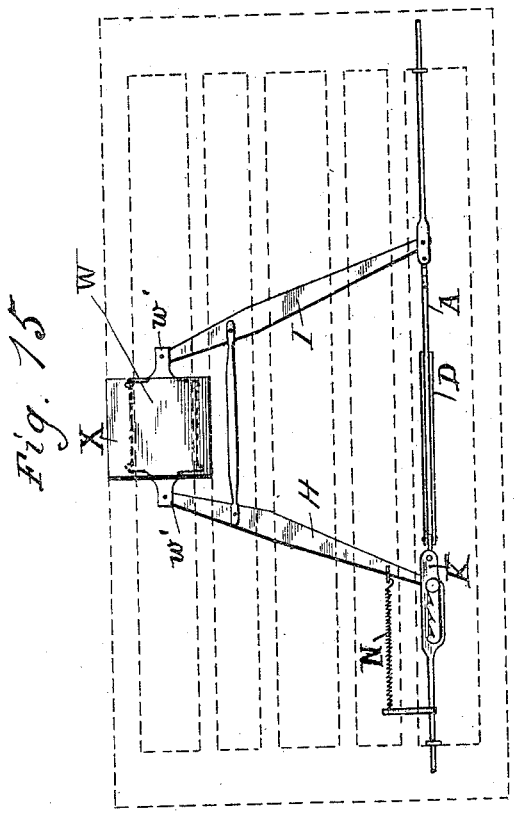

(No Model.)  3 Sheets—Sheet 1.
F. & J. W. CYR.
CAR BRAKE ADJUSTER.
No. 491,535. Patented Feb. 14, 1893.
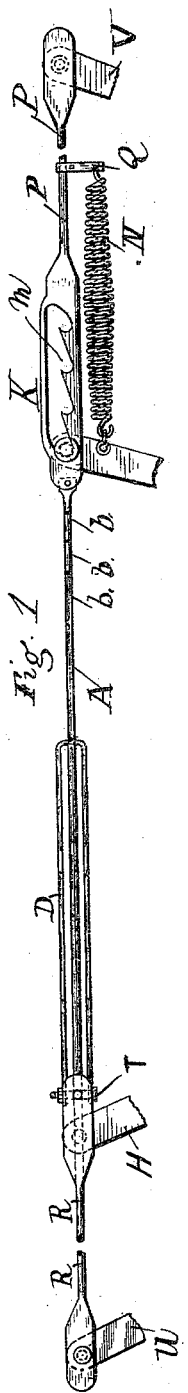
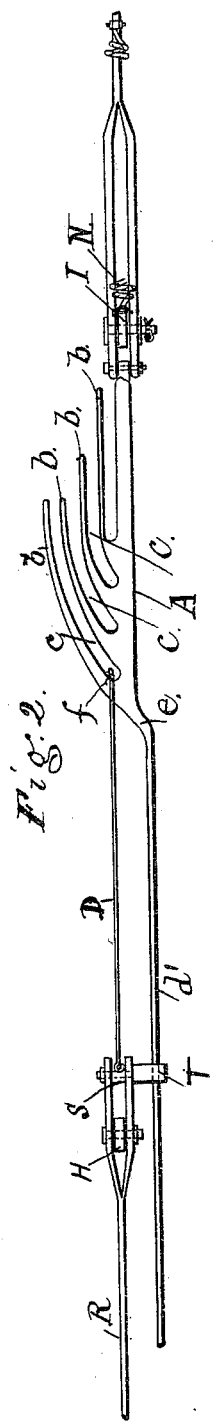
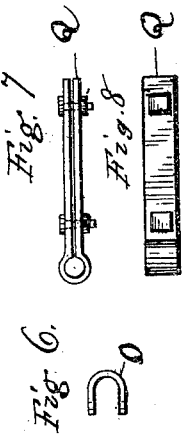
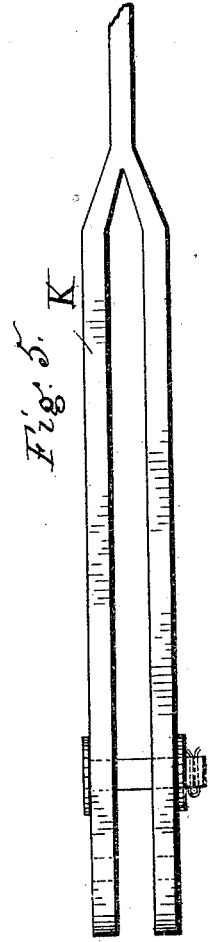
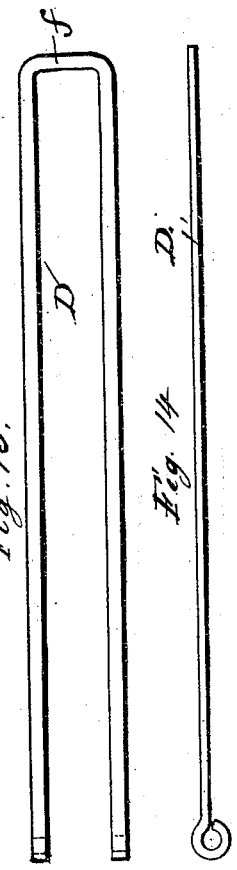
Witnesses
Harry V. Calver
Claude J. Kesler
Inventors
Felix Cyr
Joseph W. Cyr
By John J. Halsted & Son
their Attorneys.
THE NORRIS PETERS CO., PHOTO-LITHO., WASHINGTON, D.C.

(No Model.) 3 Sheets—Sheet 2.
F. & J. W. CYR.
CAR BRAKE ADJUSTER.
No. 491,535. Patented Feb. 14, 1893.
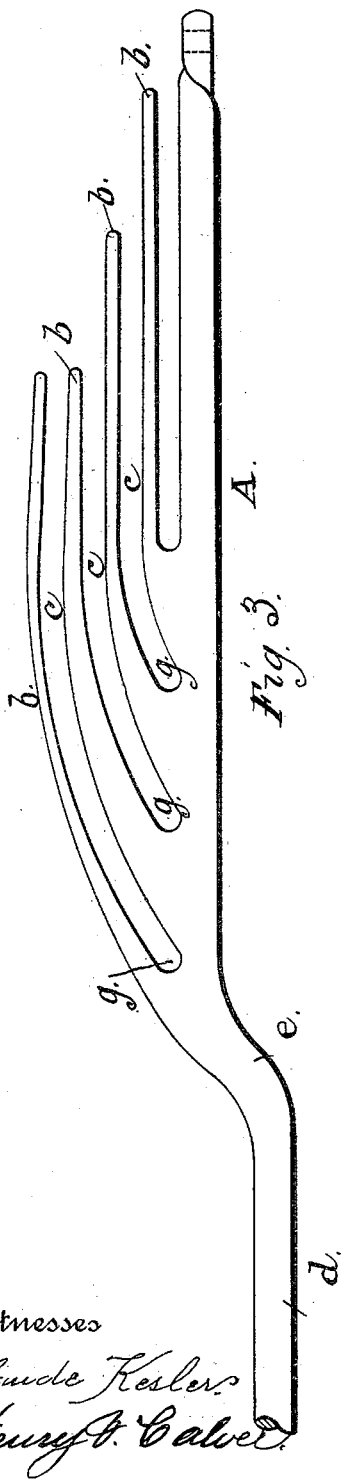
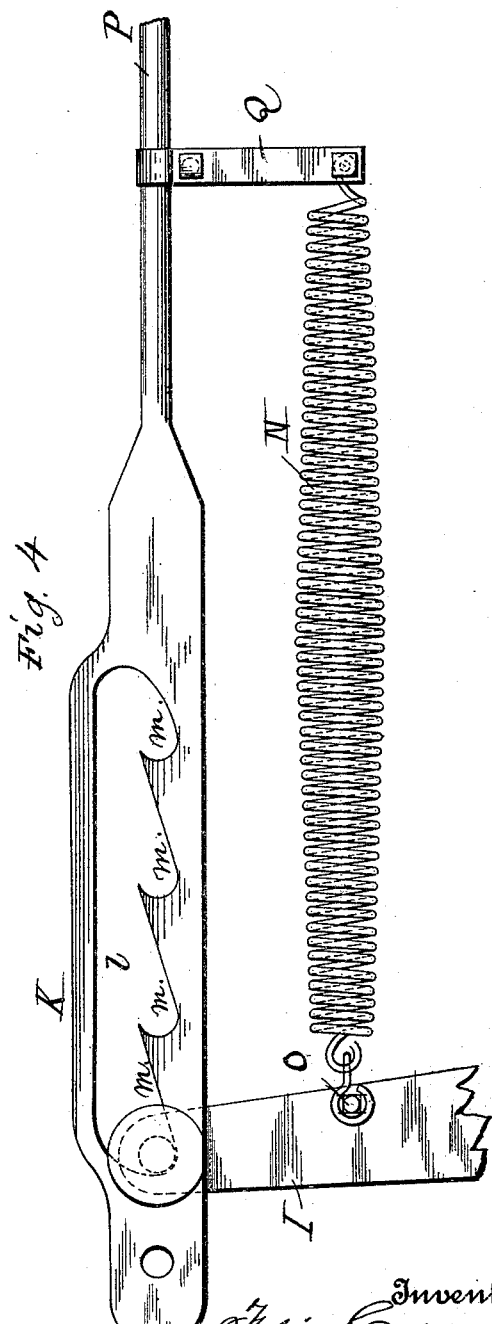
Witnesses
Claude Kesler
Henry B. Calver
Inventors
Felix Cyr
Joseph W. Cyr
By John Halsted Jr. their Attorneys (No Model.) 3 Sheets—Sheet 3.

F. & J. W. CYR.
CAR BRAKE ADJUSTER.

No. 491,535. Patented Feb. 14, 1893.

Witnesses
Claude Kesler
Henry E. Calver

Inventors
Felix Cyr
and
Joseph W. Cyr
by
John J. Halstead their Attorneys

UNITED STATES PATENT OFFICE.

FÉLIX CYR AND JOSEPH W. CYR, OF AURORA, ILLINOIS.

CAR-BRAKE ADJUSTER.

SPECIFICATION forming part of Letters Patent No. 491,535, dated February 14, 1893.

Application filed July 28, 1892. Serial No. 441,469. (No model.)

*To all whom it may concern:*

Be it known that we, FÉLIX CYR and JOSEPH W. CYR, of Aurora, in the county of Kane and State of Illinois, have invented certain new and useful Improvements in Automatic Take-Ups or Brake-Adjusters for Railway-Cars; and we do hereby declare that the following is a full, clear, and exact description of the invention, which will enable others skilled in the art to which it appertains to make and use the same, reference being had to the accompanying drawings, and to letters of reference marked thereon, which form a part of this specification.

Our invention has for its object the automatic "take up" of slack in railway car-brakes; and it can be applied to any car or cars which are equipped with air, vacuum, steam, or any other class of brakes.

It is well known that in use, brakes gradually become less and less efficient as to their braking action, because of the wear, and consequent lost motion arising therefrom: numerous devices have heretofore been invented for compensating from time to time for such slack in order to work the brakes effectively, but generally these devices known as "take-ups" have not been automatic. Our "take-up" may also vary in position according to the style of brakes on which it is to be used.

The aim sought and accomplished by our invention, is a special construction, whereby when a limited or pre-determined degree of slack exists, it will be positively and automatically taken up; and when afterward another given amount of slack shall exist, it will also be similarly taken up; and so on successively to any reasonable extent of slack likely to occur in practice.

In the accompanying drawings which illustrate a form of devices embodying the principle of our invention:—Figure 1. is a plan of our improved "take-up" in position as applied to the under side of a car. Fig. 2. a side view of the same: Fig. 3. an enlarged fragmentary view showing the fingers: Fig. 4. an enlarged fragmentary view showing the spring and its connections: Figs. 5 to 14 details: and Fig. 15 illustrates the apparatus as applied to the under side of a car, and with a slightly different arrangement of the parts.

A. indicates that part of our construction which, we style "take up No. 1.," it may be made of malleable or wrought iron, and is provided with a series of fingers $b.$ $b.$ &c., which vary in length as seen, and which have between them open slits or spaces $c.$ $c.$ &c. for the reception of a long clevis or loop D. presently to be described, which hooks upon one or the other of the fingers and is there held until the wear permits it to escape from between any two of the fingers and then engage in the space between other adjacent fingers, and there, remain until another automatic adjustment takes place. This part A. it will be seen has its fingers $b.$ and spaces $c.$ out of line with its straight rod portion $d.$ which has a bent part $e.$ such that when the loop end $f$, of the clevis D. lies in the bight $g.$ of either of the curved slits $c.$ the clevis will be substantially parallel with slide rod $d'.$ and in the line of pull. The arched form of the outer fingers however, when the clevis D. is slack, carries the bight or hook end $f.$ out of line and upward along such arch or curve: and when the slack is sufficient, the end $f.$ drops from one slit onto one of the longer fingers $b.$ and is thus in position to engage with another space or slot $c.$ It will be noticed that the closed ends $g.$ of these slits, are all located in a line with clevis D. in its position shown in Fig. 2. The length of slide rod $d'.$ is determined by the distance between the cylinder levers H. I.

K. indicates that part of our apparatus which we style "take up No. 2." It may be made of wrought iron: and is provided with a notched slot $l.$ having a series of notches $m.$ which are governed by the length of fingers $b.$ N. is a spring which in practice may be eighteen inches long when closed or not distended: and connected at one end to the cylinder lever I., by means of a clevis or equivalent means O., and its other end is fastened to brake rod P. by means of a clamp Q. The length of clevis or loop D. may be varied to adapt it to the fingered part A. It is connected to the brake rod R, by an iron block S. which is held in place by means of the support T. which connects with the fingered part A. at its rod end.

U. V. indicate the brake levers, and W. the cylinder, shown in dotted lines in Fig. 15. beneath a supporting plate X.

$w'$ $w'$ represent the projecting ends of the cylinder piston.

Z. is a rod connecting the cylinder lever H. I.

When the brakes are set, the cylinder levers draw toward each other at their diverging ends, and to which our devices are connected substantially as shown; this causes the long clevis D. to ride in the slot $g$, and on the finger, and to drop over the end of the finger, whenever there is slack enough in the brake shoes and rods to allow it: and then when the brakes are released, clevis D. slides down between the fingers and in the next slit $c$., and thus holds the two brake rods together, and by so doing it causes spring N. to draw the cylinder lever H. to the next notch $m$. in part K: by this action it brings the piston back to its original travel and it will so remain until there shall there again be enough slack in the brake shoes and rods, to allow it to take up another finger or notch.

It will be understood that in making our improved devices for particular kinds of cars and brakes, the fingers will be made of a length to accord with the amount of slack desired to be taken up at one time. It will also be understood that our improvement is such as to compensate for all wear and lost motion, due to the wear of the brakes or wheel; and for any other wear which can effect the proper action of the brakes, and due to the constant rattle of the levers, pins, links &c. that go to make up the train-brakes as fitted to the cars of a passenger train. Because of such wear, as is well known, the action of a brake becomes slower, for the reason that the "lost motion" must all be taken up, before the brake can be brought into position to act at all.

Our take-up or self-adjuster is simple of construction; can be made relatively cheaply: is not likely to get out of order, and we find it to work equally well when the brakes are set by hand, as when applied by air or other power, this latter feature does not attach to any other take-up known to us.

We claim.

1. In an automatic brake-adjuster or "take-up," the slide rod $d$. bent out of line, and provided at such bent portion with a series of fingers $b$. $b$. of different lengths, and a series of slits $c$. $c$. between such fingers, the parts $g$. $g$. of such slits being substantially in line with each other and adapted for a loop or clevis, all as set forth.

2. In combination with rod $d$. provided with the slits and fingers as described, the clevis D., and the notched piece K all as set forth.

3. In combination, the part A. having the fingers and slide rod as described, clevis D., notched piece K, spring N., and cylinder levers H. I., all substantially as and for the purposes set forth.

4. In combination with the brake rods, and brake levers, and with the piston cylinder, and its levers H. I., the fingered part A. $b$. $c$. $d$. having the construction described, the clevis D. part K., having a notched slot $m$, and the spring N., connected to lever I., the combination being and operating substantially as set forth.

FÉLIX CYR.
JOSEPH W. CYR.

Witnesses:
M. O. SOUTHWICK,
LOUIS A. CYR.